United States Patent [19]

Densow

[11] 3,970,178

[45] July 20, 1976

[54] CHAIN SAW CLUTCH WITH ENGAGING AND RELEASING CENTRIFUGAL WEIGHTS

[75] Inventor: Ulrich O. Densow, Peterborough, Canada

[73] Assignee: Outboard Marine Corporation, Waukegan, Ill.

[22] Filed: Sept. 4, 1973

[21] Appl. No.: 393,758

[52] U.S. Cl............................... 192/105 BA; 30/381; 192/105 CE; 192/104 B; 192/26; 192/17 R
[51] Int. Cl.²..................... F16D 43/14; B27B 17/00
[58] Field of Search............ 192/26, 103 B, 105 BA, 192/105 CD, 114 R, 105 A, 105 BB, 104 B, 17 R, 105 CE; 30/381, 382, 383, 384, 385, 386, 387

[56] References Cited
UNITED STATES PATENTS

| | | | |
|---|---|---|---|
| 740,719 | 10/1903 | Walker | 192/106 R X |
| 771,771 | 10/1904 | Dysterud | 192/105 A |
| 1,316,432 | 9/1919 | Edens | 192/106 R X |
| 1,884,873 | 10/1932 | Roberts | 192/105 CD |
| 2,002,478 | 5/1935 | Roberts | 192/105 CD |
| 2,380,595 | 7/1945 | Hertrich | 192/103 B X |
| 2,488,599 | 11/1949 | Merz | 192/105 BA X |
| 2,809,535 | 10/1957 | Hein et al. | 192/114 R X |
| 3,324,984 | 6/1967 | Brame | 192/114 R X |
| 3,785,465 | 2/1972 | Johansson | 192/105 BA X |
| 3,804,222 | 4/1974 | Reams | 192/103 B |

*Primary Examiner*—Benjamin W. Wyche
*Attorney, Agent, or Firm*—Michael, Best & Friedrich

[57] ABSTRACT

Disclosed herein is a chain saw comprising a frame having a handle, a clutch driven by a drive shaft driven by an engine mounted on the frame and including a clutch shoe movable in response to clutch shoe rotation relative to a position of driving engagement with a rotatable clutch drum and selectively operable means for preventing engagement of the clutch shoe with the clutch drum, a bar mounted on the frame for movement between a first position spaced from the handle and a second position adjacent to the handle, means operably connected to the bar for operating the means for preventing engagement of the clutch shoe with the clutch drum to prevent clutch shoe engagement when the bar is in the first position and to permit clutch shoe engagement when the bar is in the second position, and means operable for braking rotation of the clutch drum when the bar is in the first position.

24 Claims, 20 Drawing Figures

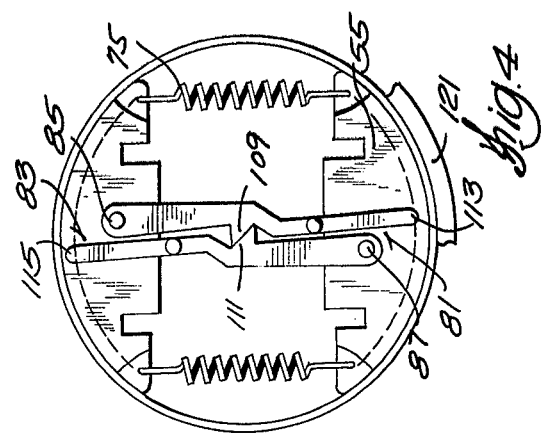
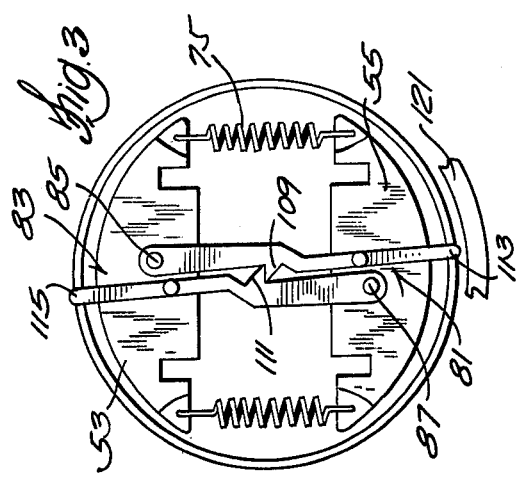
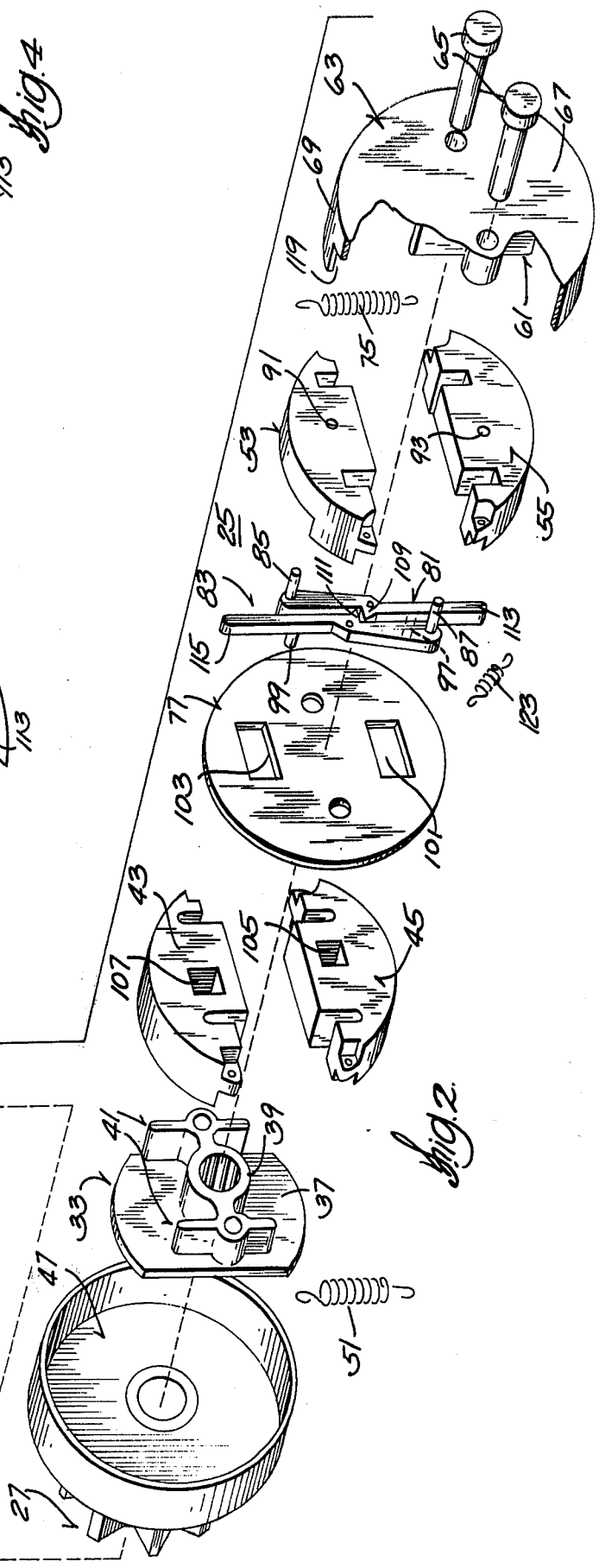

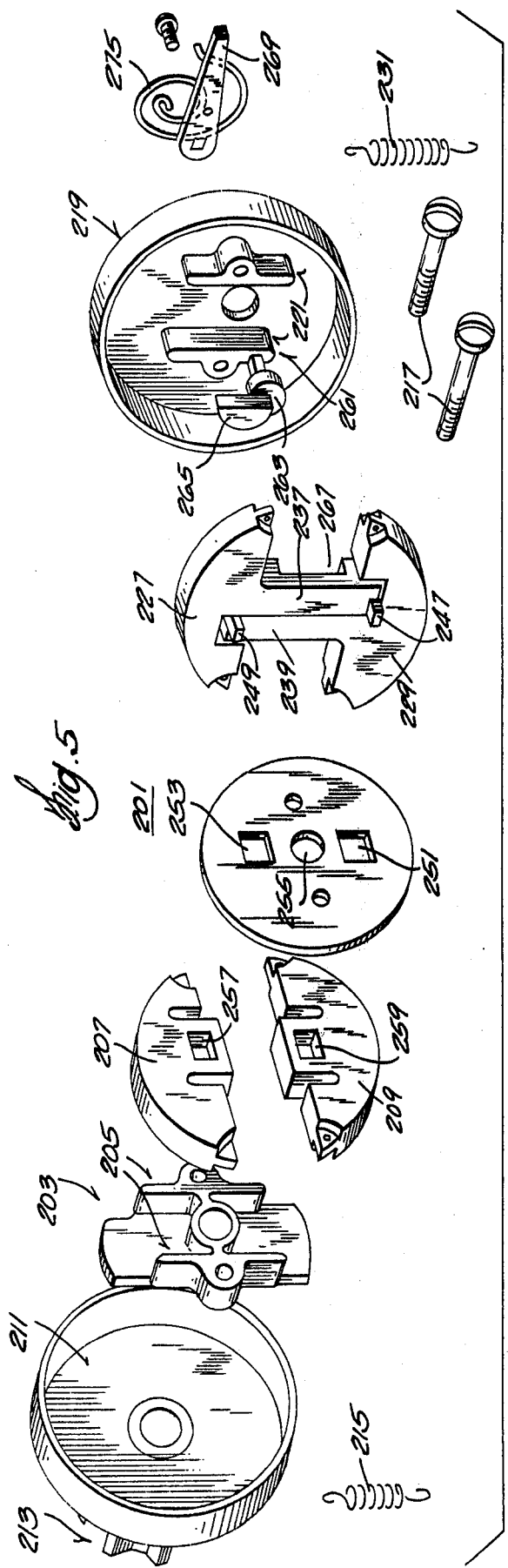
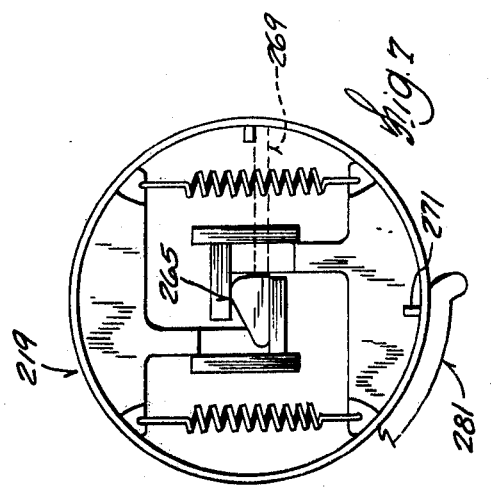
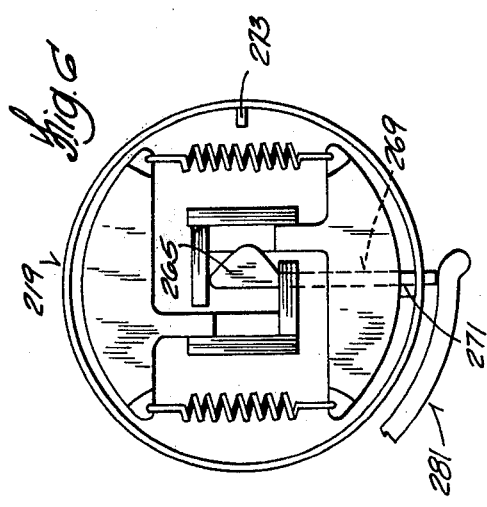

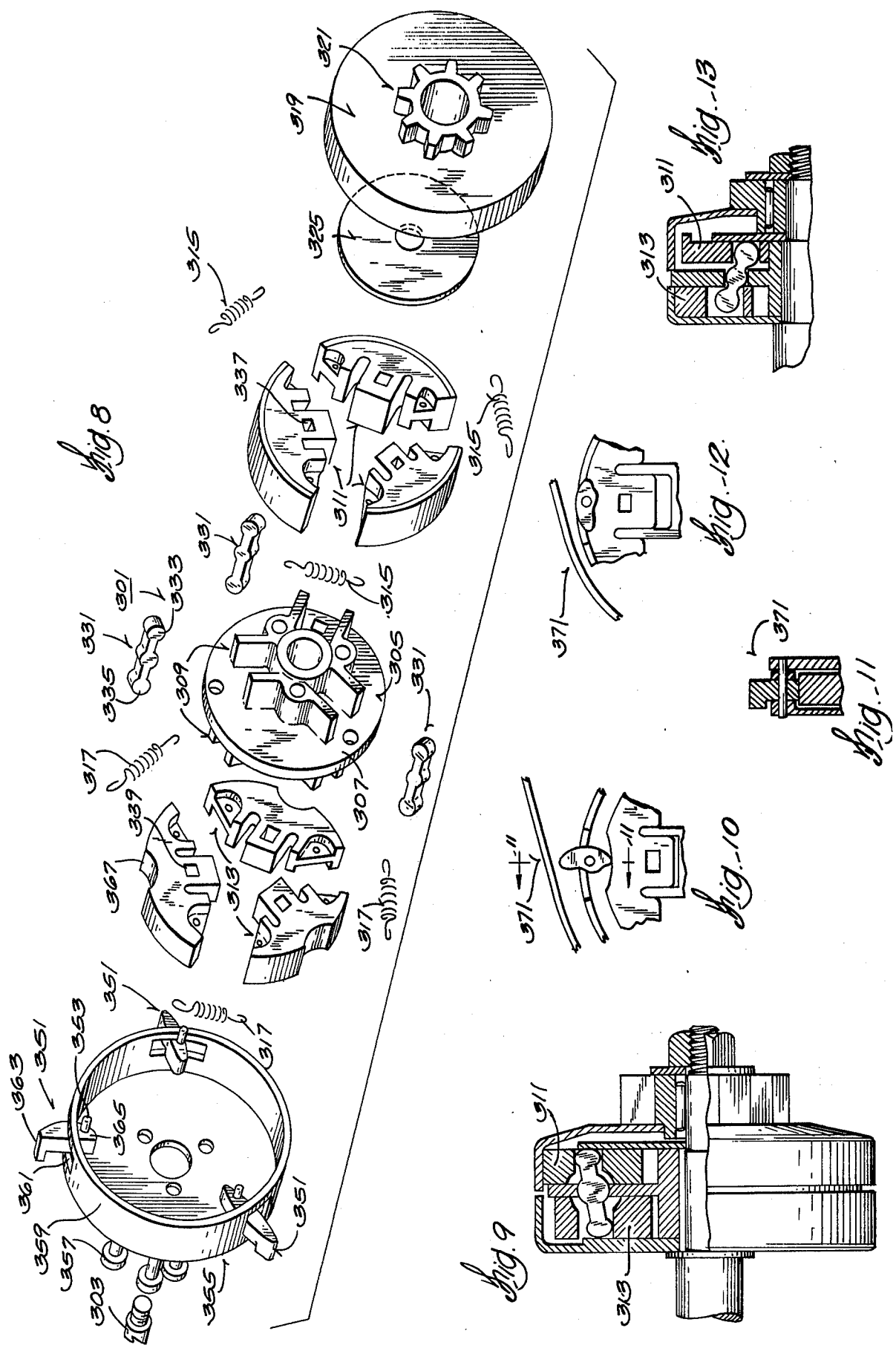

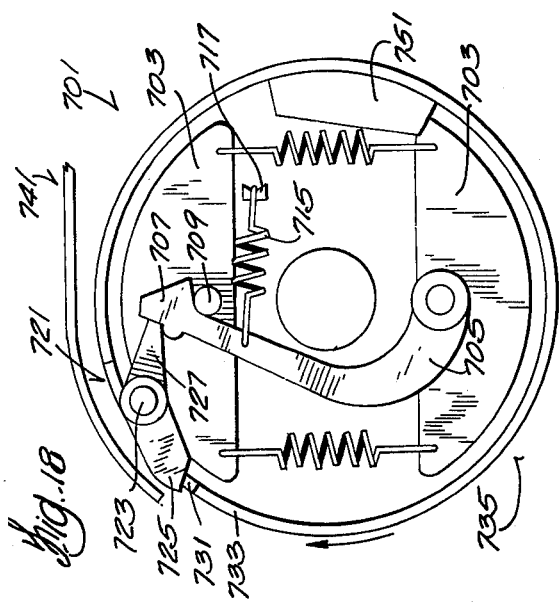
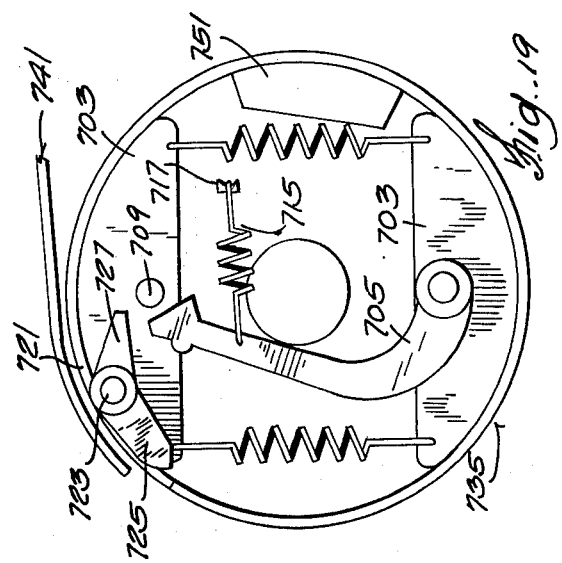
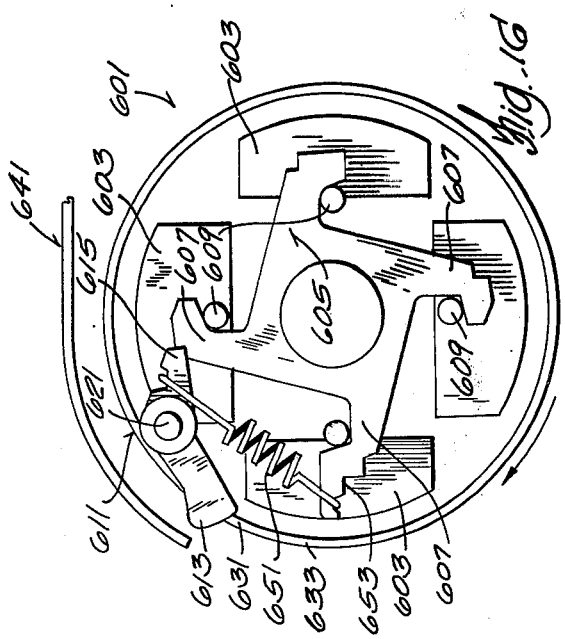
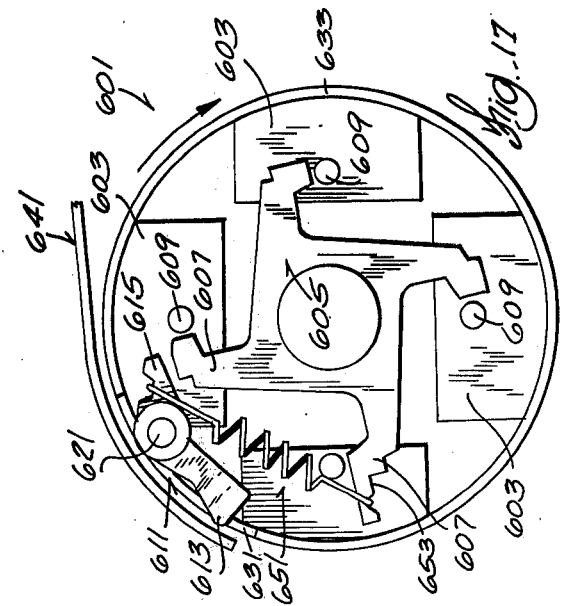
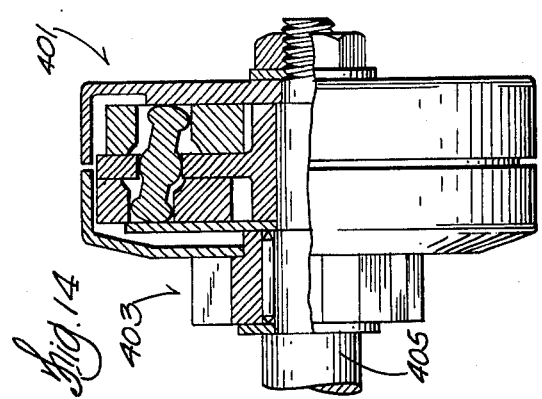
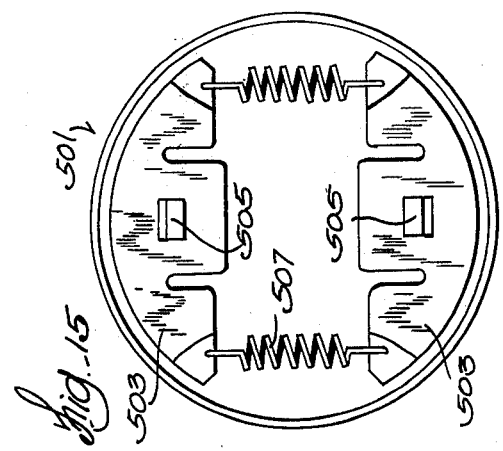

CHAIN SAW CLUTCH WITH ENGAGING AND RELEASING CENTRIFUGAL WEIGHTS

BACKGROUND OF THE INVENTION

The invention relates generally to chain saws and more particularly to centrifugal clutches for chain saws.

Attention is directed to the following prior United States patents which disclose chain saw clutches:
  Irgens, U.S. Pat. No. 3,144,890, issued Aug. 18, 1964
  Dillman, U.S. Pat. No. 3,339,596, issued Sept. 5, 1967
  Mattsson, U.S. Pat. No. 3,664,390, issued May 23, 1972
  Linkfield, U.S. Pat. No. 3,519,037, issued July 7, 1970

Attention is also directed to German Offenlegungsschrift No. 2,207,244 and to Swedish Utlaggningsskrift No. 354,799.

SUMMARY OF THE INVENTION

The invention provides a chain saw including a centrifugal clutch which includes means for preventing driving engagement thereof and of discontinuing driving engagement of the clutch in the event a safety bar is not retained in a given position by the operator and preferably in position adjacent to one of the chain saw handles. Thus, upon starting or when the engine is operating at cutting speeds, if the safety bar is not retained in the given position, drive to the saw chain is precluded. Additionally, the clutch drum can be simultaneously braked to prevent or reduce continued movement of the saw chain. Thus, there is provided a safety arrangement which will prevent saw chain movement, notwithstanding engine operation in the event that the safety bar is not gripped by the operator.

More particularly, the invention provides a chain saw comprising a frame, a centrifugal clutch driven by a shaft which, in turn, is driven by an engine mounted on the frame, which centrifugal clutch includes a rotatable clutch drum, a clutch shoe rotated by a clutch drive element and movable relative to a position of driving engagement with the clutch drum in response to clutch shoe rotation, and selectively operable means for preventing engagement of the clutch shoe with the clutch drum, together with a safety bar mounted on the frame for movement between a first position and a second position spaced from the first position, and means operably connected to the clutch drum to prevent clutch shoe engagement when the safety bar is in the first position and to permit clutch shoe engagement when the safety bar is in the second position.

In further accordance with the invention, there is also provided means operable to brake clutch drum rotation in response to movement of the safety bar to the first position which is spaced from a frame as compared to the second position which is adjacent to a frame handle.

In further accordance with the invention, the means for preventing engagement of the clutch shoe with the clutch drum includes a counterweight having a mass greater than the clutch shoe and mounted for rotation by the drive element in common with the clutch shoe and for radially outward movement from an inner position to an outer position in response to counterweight rotation, together with means connecting the clutch shoe and the counterweight for preventing engagement of the clutch drum by the clutch shoe in response to outward counterweight movement. Still more particularly, the means for preventing clutch shoe engagement with the clutch drum includes trigger means carried by the clutch for releasably preventing outward counterweight movement from the inner position to the outer position.

The invention also provides a centrifugal clutch including a clutch shoe carried by a drive element for rotation in response to drive element rotation and for radially outward movement from an inner position to an outer position of driving engagement with a clutch drum in response to clutch shoe rotation, together with selectively operable means for preventing engagement of the clutch shoe with the clutch drum. Such means for preventing engagement of the clutch shoe with the clutch drum includes a counterweight having a mass greater than the clutch shoe and mounted on the drive element for rotation in response to drive element rotation and for radially outward movement from an inner position to an outer position in response to counterweight rotation, together with means connecting the clutch shoe and the counterweight for preventing engagement with the clutch drum by the clutch shoe in response to outward movement of the counterweight. Such means for preventing clutch shoe engagement with the clutch drum includes trigger means carried on one of the drive element and the counterweight for releasably preventing outward counterweight movement from the inner position to the outer position.

Still further, there is also preferably provided means for biasing the clutch shoe toward the inner position and for preventing outward movement of the clutch shoe in the absence of clutch shoe rotation above a predetermined speed, and means for biasing the counterweight toward the inner position and for preventing outward counterweight movement in the absence of counterweight rotation above a second predetermined speed less than the first predetermined speed.

When two or more counterweights are employed, the trigger means can be mounted on the counterweights for movement between a first position releasably engaging the counterweights with each other to restrain the counterweights against outward movement and a second position disengaging the counterweights from each other to permit outward counterweight movement.

The trigger means can also include a latch member movable between a first position preventing outward counterweight movement and a second position permitting outward counterweight movement, together with a trigger carried by the drive element for movement relative to a position engaged with the latch member to releasably retain the latch member in the first position, and means yieldably biasing one of the latch member and the trigger to releasably retain the latch member in the position.

The invention also relates to a centrifugal clutch including a plurality of counterweights equal in number to the clutch shoes and mounted in axial alignment with the clutch shoes for rotation in response to drive element rotation, which counterweights have a mass greater than the clutch shoes, together with means connected to the clutch shoes and counterweights for preventing engagement of the clutch drum by the clutch shoes in response to outward counterweight movement. The clutch shoes and counterweights can be located on opposite sides of the drive element and, when there are two counterweights, the means for preventing engagement of the clutch drum by the clutch shoes can comprise two rocker arms mounted in the drive element and respectively operably connected between the respectively axially aligned counterweights and clutch shoes.

One of the principal features of the invention is the provision of chain saw including a safety bar operable in relation to a centrifugal clutch to disconnect the engine from the saw chain when the safety bar is displaced from a hand-held position adjacent to a chain saw handle.

Another of the principal features of the invention is the provision of a chain saw as set forth in the preceding paragraph and further including means operable to brake rotation of a centrifugal clutch drum connected to the saw chain in response to disconnection of the engine from the saw chain occurring incident to movement of the safety bar from the hand-held position.

Another of the principal features of the invention is the provision of a centrifugal clutch including means adapted for actuation independently of the rate of clutch rotation for disconnecting the normal drive engagement of the clutch occurring in response to clutch rotation.

Still another of the principal features of the invention is the provision of a chain saw having a centrifugal clutch with a safety disconnect operable by safety bar which also serves to operate a clutch drum brake.

Still another of the principal features of the invention is the provision of chain saw centrifugal clutch including a safety disconnect which is operable without generation of high stresses incident to disconnection.

Other features and advantages of the invention will become known by reference to the following drawings, general description and claims.

DRAWINGS

FIG. 2 is an exploded perspective view of the components of a centrifugal clutch which is in accordance with the invention and which can be incorporated in the chain saw shown in FIG. 1.

FIG. 3 is an elevational view showing various components of the clutch shown in FIG. 2 wherein the clutch shoes are in the position of driving engagement with the clutch drum.

FIG. 4 is a view similar to FIG. 3 showing various of the components of the clutch shown in FIG. 2 when the clutch shoes have been disconnected from the clutch drum by reason of counterweight movement.

FIG. 5 is an exploded perspective view of still another embodiment of a centrifugal safety clutch in accordance with the invention.

FIG. 6 is an elevational view of still another embodiment of a safety clutch which is in accordance with invention, which is slightly modified as compared to the clutch shown in FIG. 5, and which shows the clutch shoes in driving engagement with the clutch drum.

FIG. 7 is a view of still another embodiment of a safety clutch which is in accordance with the invention, which is slightly different from the clutches of FIGS. 5 and 6, and which shows the components when the clutch shoes are retracted from their positions of driving engagement with the clutch drum due to outward movement of the counterweights.

FIG. 8 is a perspective view of still another safety clutch which is in accordance with the invention and which can be included in the chain saw shown in FIG. 1.

FIG. 9 is an elevational view, partially broken away and in section showing various of the components of the clutch drum in FIG. 8 when the clutch shoes are in driving engagement with the clutch drum.

FIG. 10 is a fragmentary view showing a portion of the centrifugal clutch shown in FIG. 8.

FIG. 11 is a fragmentary sectional view taken generally along line 11—11 of FIG. 10.

FIG. 12 is a view similar to FIG. 10 with the components in a differnt operating position.

FIG. 13 is a fragmentary view similar to FIG. 9 showing the condition of the components when the clutch shoes have been withdrawn from driving engagement with the clutch drum due to outward counterweight movement.

FIG. 14 is a fragmentary view, partially broken away and in section, of still another safety centrifugal clutch in accordance with the invention.

FIG. 15 is a fragmentary view, partially broken away and in section, of still another safety centrifugal clutch in accordance with the invention.

FIGS. 16 and 17 are elevational views of still another safety centrifugal clutch which is in accordance with the invention.

FIGS. 18 and 19 are elevational views of still another safety centrifugal clutch in accordance with the invention.

DESCRIPTION OF THE PREFERRED EMBODIMENT

Figure 1:
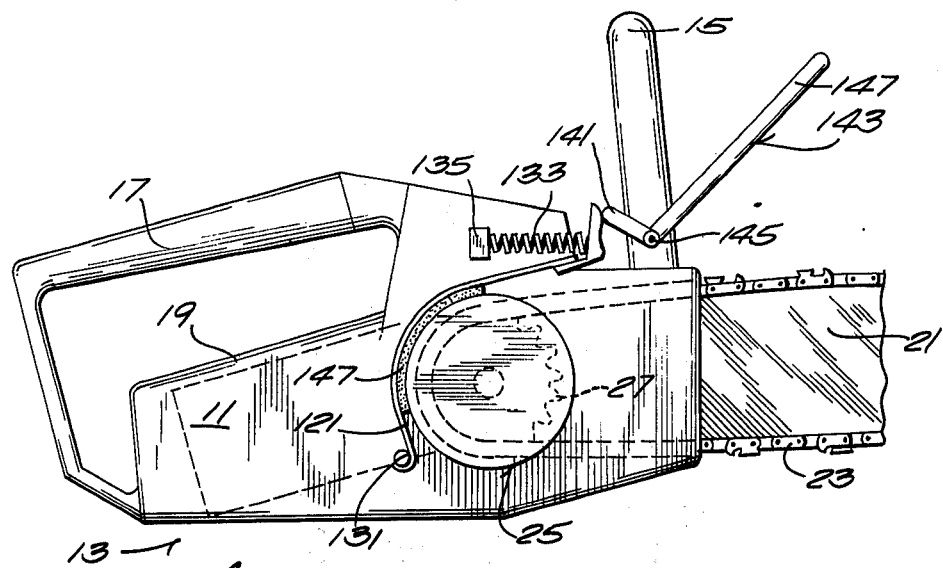
FIG. 1 is a side elevational view of a chain saw embodying various features of the invention.
Figure 1A:
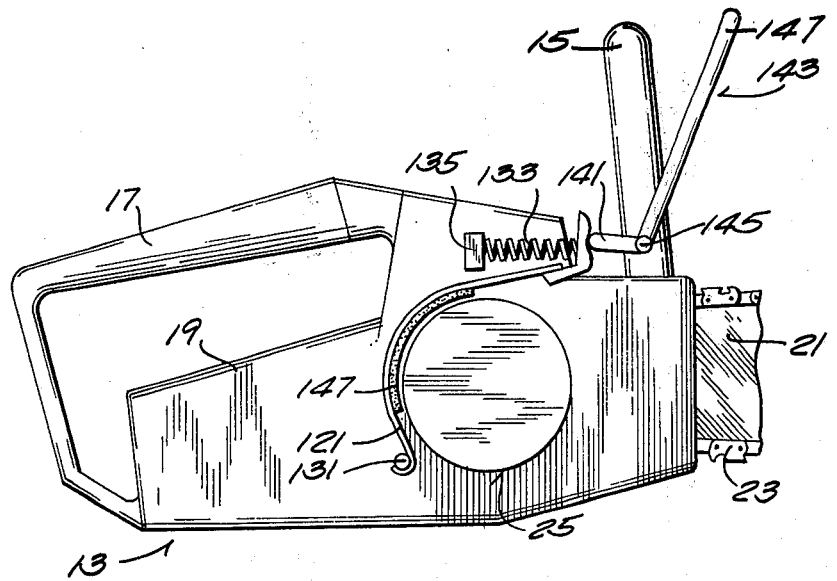
FIG. 1A is a view similar to FIG. 1 showing various of the components of the saw chain shown in FIG. 1 in different positions.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

GENERAL DESCRIPTION

Shown in FIG. 1 is a chain saw 11 including a main frame 13 which includes a front handle 15 and a rear handle 17 and which supports an internal combustion engine 19, as well as a cutter bar 21 around which is guided a saw chain 23. Power is transmitted from the engine 19 to the saw chain 23 through a centrifugal clutch 25 and a drive sprocket 27 driven by the centrifugal clutch 25.

The centrifugal clutch 25 is shown in greater detail in FIGS. 2 through 4 and includes a drive element 33 which is splined, or keyed, or otherwise mounted on and for common rotation with a drive shaft 35 which supports the centrifugal clutch 25 and which supplies power from the engine. The drive shaft 35 can be either the engine output shaft or an other shaft drive by the output shaft.

While other specific constructions are employed, the drive element 33 comprises a disc 37 extending from a hub 39 which is splined to the drive shaft 35. Formed on one surface of the disc 37 is a guide means 41 for a pair of diametrically oppositely arranged clutch shoes 43 and 45 which, in response to rotation, are displaced radially outwardly and away from each other for engagement with the inner surface of a clutch drum 47 which is rotatably carried on the drive shaft 35 and which is drivingly connected to the chain sprocket 27. It is noted that engagement of the clutch drum 47 by the clutch shoes 43 and 45 is accomplished consequent to initial sliding engagement between the clutch shoes 43 and 45 and the clutch drum 47.

The drive sprocket 27 can be integral with the clutch drum 47, or can be mounted thereon, or can be either a so-called inner or outer sprocket, i.e., the sprocket can be located inwardly relative to the clutch drum from the outer end of the drive shaft, or can be located outwardly of the clutch drum relative to the outer end of the drive shaft.

Means are provided for preventing outward movement of the clutch shoes 43 and 45 to engage the clutch drum 47 in the absence of rotation about a predetermined speed which is hereinafter referred to as the "predetermined high speed." While other arrangements can be employed, in the construction illustrated in FIGS. 2 through 4, such outward movement is restrained by a pair of helical springs 51 (only one shown in FIG. 2) which extend on opposite sides of the rotational axis and which, at their opposite ends, are connected to the opposed clutch shoes 43 and 45.

Carried to the drive element 33, for common rotation therewith, is selectively operable means for preventing initial engagement of the clutch shoes 43 and 45 the clutch drum 47 notwithstanding rotation of the drive element at rate above the predetermined high speed, and for discontinuing engagement of the clutch drum 47 by the clutch shoes 43 and 45 regardless of the rate of drive element rotation.

In accordance with the invention, such means includes a pair of diametrically oppositely located counterweights 53 and 55 which rotate in common with the drive element 33, which are mounted in respective axial alignment with the clutch shoes 43 and 45 for radial movement in response to counterweight rotation, and which have a mass or weight greater than the clutch shoes 43 and 45.

Means are also provided for respectively interconnecting the counterweights 53 and 55 with the clutch shoes 43 and 45 for displacing the clutch shoes 43 and 45 inwardly in response to outward movement of the counterweights 53 and 55, and for preventing outward movement of the clutch shoes 43 and 45 when the counterweights 53 and 55 have previously been located in their outward positions.

Still further in addition, means are provided for releasably preventing radial outward movement of the counterweights 53 and 55 and for selectively actuating the counterweight outward movement preventing means.

More specifically, the counterweights 53 and 55 are guided for radial movement by suitable guide means 61 formed on a support or cup member 63 which is fixed to the drive element 33 by suitable means such as a pair of mounting screws 65. As shown in FIG. 2, the support or cup member 63 includes a disc portion 67 from which the guide means 61 extends and an annular flange 69 which limits outward movement of the counterweights 53 and 55.

Means are provided for yieldably opposing or preventing outward movement of the counterweights 53 and 55 in the absence of rotation above a predetermined speed which is less than the predetermined high speed and which is hereinafter referred to as the "predetermined low speed." While various arrangements can be employed, in the disclosed construction, such means comprises a pair of helical springs 75 (one shown) respectively located at opposite sides of the rotational axis and connected, at their ends, to the oppositely arranged counterweights 53 and 55.

Separating the counterweights 53 and 55 from the clutch shoes 43 and 45 is a washer or spacer 77 which is also fixed to the drive element 33 by the screws 65. In this last regard, the screws 65 extend through the counterweight guide means 61 and through the washer 77 and into the guide means 41 of the drive element 33 in such a manner as not to interfere with radial movement of the clutch shoes 43 and 45 and the counterweights 53 and 55.

Various arrangements can be employed to cause inward clutch shoe movement in response to outward counterweight movement and to prevent outward movement of the clutch shoes 43 and 45 in the event the counterweights 53 and 55 have previously moved to their outer positions. In the construction illustrated in FIGS. 2, 3 and 4, such means comprises a pair of fingers 81 and 83 which are respectively pivotally carried by the counterweights 53 and 55. Specifically, in the illustrated construction, the fingers 81 and 83 are pivotally mounted by respective pins 85 and 87 extending into respective apeneratures 91 and 93 in the counterweights 53 and 55.

Extending from each of the fingers 81 and 83 are respective pins 97 and 99 which respectively extend through openings 101 and 103 in the spacer 77 and which are engageable with the readially inner surface of respective aperatures or slots 105 and 107 in the clutch shoes 43 and 45 opposite from the counterweights 53 and 55 on which the fingers 81 and 83 are carried. The aperatures or slots 105 and 107 are radially elongated so as to permit outward movement of the clutch shoes 43 and 45 when the counterweights 53 and 55 are retained in their inner positions. However, when the counterweights 53 and 55 move outwardly, such movement causes the pins 97 and 99 on the fingers 81 and 83 to move radially inwardly so as to engage the radially inner surface of the slots 105 and 107 and thereby either to restrict outward movement of the clutch shoes 43 and 45 or to displace the clutch shoes 43 and 45 inwardly if in previous engagement with the clutch drum 47.

In the embodiment shown in FIGS. 2 through 4, the means for selectively preventing outward movement of the counterweights 53 and 55 comprises formation of the fingers 81 and 83 with respective integral latch parts 109 and 111 and with respective extensions or triggers 113 and 115.

As already indicated, the fingers 81 and 83 are mounted on the counterweights 53 and 55 for pivotal movement (independently of radial movement resulting from counterweight radial movement) to permit movement of the fingers 81 and 83 relative to a latched position (shown in FIG. 3) in which the latch parts 109 and 111 of the fingers 81 and 83 are engaged with each other to prevent outward counterweight movement and in which the triggers 113 and 115 project outwardly beyond the annular flange 69 of the support member 63 (and, if desired, through openings 119 in the flange).

The means for selectively activating the counterweight outward movement preventing means comprises (see FIGS. 1, 3 and 4) a member 121 which is movable into and out of position adjacent to the annular flange 69 of the support member 63 so as to selectively engage the finger triggers 113 and 115 and thereby to pivot the fingers in such direction as to disengage the latch parts 109 and 111 and thereby to permit outward movement of the counterweight 53 and 55. As already indicated, such counterweight movement diametrically oppositely displaces the fingers 81 and 83 and causes inward movement of the clutch shoes 43 and 45 and inward movement of the triggers 113 and 115 into positions clear of engagement with the actuating member 121.

Means are provided for biasing the fingers 81 and 83 for pivotal movement toward each other so as to facilitate engagement of the latch parts 109 and 111 when the counterweights 53 and 55 are in their inner positions. Various means can be provided. In the illustrated construction, such means comprises a helical tension spring 123, connected, at its ends, to the fingers 81 and 83.

In addition to the actuating member 121, the means for selectively actuating the counterweight outward movement preventing means comprises, as shown in FIG. 1, means biasing the actuating member 121 into the trigger engaging position adjacent to the annular flange 69, together with means operable in opposition to the biasing means for displacing the actuating member away from the trigger engaging position and thereby to prevent outward movement of the counterweights 53 and 55 and thereby simultaneously to permit engagement of the clutch drum 47 by the clutch shoes 43 and 45 in response to rotation above the predetermined high speed.

While various constructions could be employed, at its lower end, the actuating member 121 is pivotally mounted on a stud and is biased, at its other end, by a helical spring 133 which, at one end acts, against a shoulder or stop 135 on the frame 13 and which, at its other end, engages the upper end of the actuating member 121. A pin (not shown) can be employed interiorly of the helical spring 133 to retain the spring in position.

Engaged against the other side of the upper end of the actuating member 121 is one arm 141 of a bell crank lever 143 which is pivotally mounted 145 on the frame 13 and which includes a second arm in the form of a safety bar 147 which can be griped by the operator and held (in opposition to the spring 133) in adjacent relation to the front handle 15. In such position, the actuating member 121 is retained in a position relatively spaced from the annular flange 69 of the support member 63. However, should the operator release his grip from the front handle 15 and the safety bar 147, such action releases the bell crank lever 141 for movement under the action of the spring 133 to a position spaced relatively remotely from the front handle 15. Such spring action also causes movement of the actuating member 121 into the trigger engaging position adjacent the annular flange 69 of the support member 63. Suitable means can be provided for maintaining an operating connection between the actuating member 121 and the bell crank arm 141 so as to continously retain these components in operating relationship.

In further accordance with the invention, means are provided for braking the rotation of the clutch drum 47 when the safety bar 147 is not held in adjacent relation to the front handle 15. While other arrangements could be employed, in the illustrated construction, such means comprises mounting of a brake band 151 on the actuating member 121 for engagement with the clutch drum 47 so as to restrain rotation upon movement of the actuating member 121 to the trigger engaging position.

In operation, upon starting of the engine 19, the front handle 15 is normally not griped and accordingly, the safety bar 147 is spaced from the front handle 15 and the actuating member 121 is in the trigger engaging position. Accordingly, in response to rotation of the drive shaft 35, the triggers 113 and 115 will be displaced from their latched positions (shown in FIG. 3) and the counterweights 53 and 55 will move outwardly upon rotation above the predetermined low speed. Such outward counterweight movement prevents outward movement of the clutch shoes 43 and 45 and thereby prohibits engagement of the clutch 25. At the same time, the brake band 147 prevents movement of the clutch drum 47. So long as the safety bar 147 of the bell crank lever 143 is not moved into adjacent relation to the front handle 15, the engine 19 can be advanced to any desired throttle setting for warm-up purposes.

After the engine 19 has been warmed-up, the safety bar 147 is then moved by the operator into adjacent relation to the front handle 15, thereby displacing the actuating member 121 from the trigger engaging position. Accordingly, if the engine speed is above the predetermined low speed, the counterweights 53 and 55 will immediately move outwardly preventing engagement of the clutch shoes 43 and 45 with the clutch drum 47. However, if the engine speed falls below the predetermined low speed or if the engine speed is thereafter reduced to below the predetermined low speed, the counterweights 53 and 55 will be drawn inwardly by the springs 75 and the fingers 81 and 83 will be moved by the spring 123 to the latched position shown in FIG. 3. Thereafter, with the actuating member in the spaced position, advancement of the engine speed above the predetermined high speed will permit outward movement of the clutch shoes 43 and 45 into driving engagement with the clutch drum 47.

If the operator thereafter intentionally or otherwise permits movement of the safety bar 147 from the position adjacent to the front handle 15, the actuating member 121 will, in response to action of the spring 133, simultaneously move to the trigger engaging position, thereby relieving the latched engagement of the fingers 81 and 83 to permit outward movement of the counterweights 53 and 55 which, accordingly, cause inward movement of the clutch shoes 43 and 45 to disengage the shoes from the clutch drum 47. Simultaneously, the brake band 147 engages the clutch drum 47 to restrain or stop rotation thereof.

Shown in FIG. 5 is another embodiment of a safety clutch 201 in accordance with the invention. As in the embodiment shown in FIGS. 2 through 4, the safety clutch 201 includes a drive element 203 splined, keyed, or otherwise mounted on and for common rotation with a drive shaft (not shown). The drive element 203 includes guide means 205 for a pair of oppositely arranged clutch shoes 207 and 209 which are movable radially between retracted positions and extended positions of driving engagement with a clutch drum 211 which, in turn, is rotatably mounted on the drive shaft independently of the drive element and which suitably drives a chain sprocket engaged with a saw chain (not shown).

Means are provided for restraining outward movement of the clutch shoes 207 and 209 in the absence of rotation of the drive element 203 above a predetermined high speed. In the construction illustrated in FIG. 5, such means is in the form of a pair of helical springs 215 (not shown) which are located on opposite sides of the axis of clutch rotation and have their opposite ends connected to the oppositely arranged clutch shoes 207 and 209.

Connected to the drive element 203 for common rotation therewith by suitable means such as the screws 217 is a support member 219 including guide means 221 for a pair of oppositely arranged counterweights 227 and 229 which are located in axially aligned relation to the clutch shoes 207 and 209.

Also provided are means for restraining outward movement of the counterweights 227 and 229 in the absence of rotation of the drive element 203 and the support 219 above a predetermined low speed. In the construction illustrated in FIG. 5, such means are provided in the form of a pair of helical springs 231 (one shown) located on opposite sides of the axis of clutch rotation, and connected at their ends to the oppositely arranged counterweights 227 and 229.

Connected between the clutch shoes 207 and 209 and the opposite counterweights 229 and 227, are means for displacing the clutch shoes 207 and 209 inwardly in response to outward counterweight movement and for preventing outward clutch shoe movement when the counterweights 227 and 229 are in their radially outer positions. In the construction illustrated in FIG. 5, such means comprises respective legs 237 and 239 extending from the counterweights 227 and 229 including respective projections 247 and 249 extending through respective aperatures 251 and 253 in a spacer or washer 255 and into respective aperatures or slots 257 and 259 in the clutch shoes 207 and 209 for engagement therewith, in the same manner as described with respect to the construction illustrated in FIGS. 2 through 4.

In the construction shown in FIG. 5, the legs 237 and 239 cooperate with each other and with the guide means 221 on the support member 219 to guide radial movement of the counterweights 227 and 229.

As in the construction illustrated in FIGS. 2 through 4, means are also provided for preventing outward counterweight movement. In the construction illustrated in FIG. 5, such means comprises a rotatable cam element 261 including a bearing part 263 located in an aperature in the support member 219 co-axial with the clutch rotational axis. Extending from the bearing part 263 is a half circle cam 265 engageable in a groove 267 in the adjacent surface of the legs 237 and 239. The cam element 261 is operable between two positions spaced angularly from each other at about 90° so that, in one position, outward counterweight movement is prevented and so that, in the other position, the counterweights 227 and 229 are free to move outwardly.

Trigger means are also provided. In the construction illustrated in FIG. 5, such means comprises a trigger or lever 269 which is suitably fixed to the cam element 261 for common rotation in such manner that, when the cam element 261 is in the position preventing outward counterweight movement, the trigger or lever 269 extends beyond the periphery of the support member 219 and such that, when the cam element 261 is in the position permitting outward counterweight movement, the trigger or lever 269 does not appreciably project beyond the periphery of the support member 219.

Means are also provided for limiting rotary movement of the lever or trigger 269 and the cam element 261 in the form (see FIGS. 6 and 7) of angularly spaced stops 271 and 273 projecting on the support member 219 for engagement with the trigger 269.

Means are also provided for yieldably urging the trigger 269 and connected cam element 261 toward the position preventing outward counterweight movement. While other arrangements could be employed, in the FIG. 5 construction, such means comprises a helical spring 275 having one end fixed to the support member 219 and the other end operably connected to the trigger 269.

The trigger 269 is adapted to be engaged (see FIGS. 6 and 7) by an actuating member 281 which is operable in the same manner referred to with respect to the construction shown in FIGS. 1 through 4 and which is movable between a spaced position (see FIG. 6) and a trigger engaging position (see FIG. 7) as described with respect to the construction illustrated in FIGS. 1 through 4.

In the FIG. 5 construction, when the actuating member 281 is moved to the trigger engaging position, during clutch rotation, the trigger 269 engages the actuating member 281, and is pivoted to the position in which the cam element 261 moves to the position permitting outward counterweight movement and in which the trigger 269 no longer appreciably projects beyond the support member 219. When the actuating member 281 is released or displaced to the spaced position (as shown in FIG. 6) the spring 275 returns the trigger 269 and cam element 261 to the position preventing outward counterweight movement after reduction of the clutch speed to below the predetermined low speed so as to cause return of the counterweights 227 and 229 to their inner positions under the influence of the springs 231.

Schematically shown in FIG. 6 is another embodiment of a safety clutch construction which is shown in the position preventing outward counterweight movement and thereby permitting clutch engagement in response to drive element rotation above the predetermined high speed. The construction shown in FIG. 6 is basically the same as that shown in FIG. 5 except that the cam part 265 is approximately in the shape of a 45° — 90° — 45° triangle. The same numerals have been applied to the components shown in FIG. 6 as have been applied to the corresponding components of the construction shown in FIG. 5.

Schematically shown in FIG. 7 is another embodiment of a safety clutch arrangement which is shown in the position permitting outward counterweight movement to thereby disengage the clutch shoes from the clutch drum. The construction shown in FIG. 7 is basically the same as shown in FIG. 5 except that the cam part 265 is approximately in the shape of a 30° — 60° — 90° triangle and the legs are provided with ribs which cooperate with the cam part and extend transversely to the direction of counterweight radial movement. The same numerals have been applied to the components shown in FIG. 7 as have been applied to the corresponding components of the construction illustrated in FIG. 5.

Shown in FIGS. 8 through 13 is still another safety clutch 301 which embodies sliding engagement of the clutch shoes with the clutch drum during initiation of clutch engagement. More particularly, the safety clutch 301 is mounted on and driven from a shaft 303 which is keyed, or splined, or otherwise attached for common rotary movement to a drive element 305 which is in the form of a disc 307 having, on the opposite sides thereof, axially aligned guide means 309 for guiding radial movement of a plurality of clutch shoes 311 located on one side of the disc 307 and for guiding radial movement of a like plurality of counterweights 313 which are located on the other side of the disc 307 and which have a mass or weight greater than the clutch shoes 311. The pluralities of clutch shoes and counterweights can be two, three, four, or more. In the construction illustrated in FIGS. 8 through 13, each plurality is comprised of three units.

As in the other embodiments, means are provided for yieldably restraining or preventing outward clutch shoe movement in the absence of rotation above a predetermined high speed. In the construction shown in FIGS. 8 through 13, such means comprises a plurality of three helical springs 315 which have their ends connected to adjacent portions of adjacent clutch shoes 311 in a garter-like arrangement. As also in the other embodiments, means are provided for yieldably restraining or preventing outward counterweight movement in the absence of rotation above a predetermined low speed. In the construction shown in FIGS. 8 through 13, such means comprises a plurality of three helical springs 317 which have their ends connected to adjacent portions of adjacent counterweights 313 in a garter-like arrangement.

Also carried by the shaft 303 for rotation independently of the drive element 305 is a clutch drum 319 which is connected to a chain sprocket 321 and which includes an inner cylindrical surface adapted to be engaged by the clutch shoes 311 to afford power transmission from the drive element 305 to the sprocket 321. A washer or spacer 325 is preferably carried by the shaft 303 between the clutch shoes 311 and axially adjacent portions of the clutch drum 319.

As in the other embodiments, means are provided for preventing radially outward movement of the clutch shoes 311 when the counterweights 313 are in their radially outer positions and for inwardly displacing the clutch shoes 313 from their outer engaged positions in response to outward counterweight movement. In the construction illustrated in FIGS. 8 through 13, such means comprises a series of three rocker arms 331 which are fulcrumed in the drive element 305 between axially aligned clutch shoes 311 and counterweights 313 and which include oppositely extending legs 333 and 335 projecting into respective slots 337 and 339 in the axially adjacent clutch shoes 311 and counterweights 313. As shown best in FIGS. 8, 9 and 13, the end of each leg 333 and 335 is some what enlarged and rounded. In addition, the radially extent of the slots 337 in the clutch shoes 311 corresponds generally to the major dimension of the rounded end of the legs 333, while the radially extent of the slots 339 in the counterweights 313 is enlarged to permit relative radial travel between the legs 335 and the counterweights 313.

Thus, when the counterweighs 313 are in the inner positions, (see FIG. 9) the legs 335 can travel radially outwardly in the counterweight slots 339 to permit engagement of the clutch shoes 311 with the clutch drum 319. However, when the counterweights 313 are in their radially extended positions, movement of the clutch shoes 311 from their retracted positions is prevented and movement of the counterweights 313 to their radially extended positions serves to displace the clutch shoes 311 from their extended clutch drum engaging positions to their inner retracted positions out of engagement with the clutch drum 319.

As in the other embodiments, means are provided for selectively preventing movement of the counterweights 313 to their extended positions. In the construction shown in FIGS 8 through 13, such means comprises a series of triggers 351, one for each counterweight 313, which are respectively mounted for pivotal movement relative to respective pins 353 supported for common rotation with the drive element 305. Thus, in the construction shown best in FIGS. 11 through 13, the pins 353 extend from the drive element 305 and can also be supported by a cup or support member 355 which is suitably connected to the drive element 305 as by a plurality of screws 357 and which includes an outer angular flange 359 including a series of openings 361 through which the triggers 351 are respectively projectable.

In this last regard, the triggers 351 include oppositely extending trigger portions or arms 363 and cam portions or arms 365 and are eccentrically mounted on the pins 353 so as to be biased, in response to drive element rotation, into a position with the trigger arms 363 extending outwardly from the annular flange 359 and with the cam arms 365 extending inwardly into engagement at an angle of about 90° with an adjacent counterweight surface 367 so as to prevent outer counterweight movement. The counterweights springs 317 and the triggers 351 are designed so that the triggers 351 are biased to the counterweight-outward-movement-preventing positions prior to attainment of the predetermined low speed.

In response to movement of an actuating member 371 into adjacent relation to the outer annular surface 359 of the cup member 355, as explained for instance with respect to FIG. 1, the trigger arms 363 are engaged by the actuating member 371 in response to rotation in common with the drive element 305, so as to pivot the triggers to the position shown in FIG. 12, thereby permitting outward counteweight movement so as either to displace the clutch shoes 31 inwardly from positions in engagement with the clutch drum 319 or to prevent outward clutch shoe movement. As in the other embodiments, the actuating member 371 can be provided with a brake band engageable with the outer surface of the clutch drum 319 to restrain rotation thereof.

In the clutch 301 shown in FIGS. 8 through 13, a like plurality of clutch shoes 311, counterweights 313, rocker arms 331, and triggers 351 are employed. In the FIGS. 8 through 13 arrangement, the sprocket 321 is on the "outside" with respect to the end of the shaft 303. Shown in FIG. 14 is another safety clutch 401 which is basically the same construction illustrated in FIGS. 8 through 13 except that the sprocket 403 is located on the "inside" with respect to the end of the drive shaft 405. Accordingly, it is believed that the construction shown in FIG. 14 does not require further explanation.

Shown fragmentarily in FIG. 15 is a safety clutch 501 which is similar in construction to that shown in FIGS. 8 through 13 except that only two clutch shoes 503, two rocker arms 505, two clutch shoe springs 507, two counterweights (not shown), two counterweight springs (not shown), and two triggers (not shown) are employed. Otherwise, the construction of the clutch 501 is the same as is shown in FIGS. 8 through 13.

Shown in FIGS. 16 and 17 is still another safety clutch 601 which employs four counterweights 603 which are suitably guided for radial movement and which are prevented from moving radially outwardly by means in the form of a retainer 605 which is rotatably mounted on a suitable hub co-axially with the axis of clutch rotation and which includes four cam legs 607 which respectively engage four pins 609 respectively fixedly extending from the counterweights 603.

Cooperating with the retainer 605 is a trigger 611 including a trigger portion or arm 613 and an oppositely extending cam portion or arm 615 which is engageable with the retainer 605 to keep the retainer 605 in position preventing outward counterweight movement. The trigger 611 is pivotally mounted on a pin 612 having common rotation with a drive element (not shown). When the trigger 611 is in the position holding the retainer 605 in position preventing outward counterweight movement, the trigger arm 613 extends through an opening 631 in an annular flange 633 into position for engagement with an actuating member 641, such as that disclosed with respect to FIG. 1. In the event of rotation of the drive element and movement of the actuating member 641 into adjacent relation to the annular flange 633, as described with respect to FIG. 1, the trigger arm 631 is engaged by the actuating member 641 to rotate the trigger 611 in the counterclockwise direction shown in FIGS. 16 and 17 to a position permitting the counterweight pins 609 to cam the retainer 605 out of the way and thereby to permit outward counterweight movement.

As also shown in FIGS. 17 and 18, means are provided for biasing the trigger 611 toward the position holding the retainer 605 in position to prevent outward counterweight movement and to simultaneously bias the retainer 605 toward said position. Such means comprises a spring 651 connected between the cam arm 615 and a hook 653 extending from one of the retainer legs 607 and operative to bias the trigger in the clockwise direction as shown in FIGS. 16 and 17 and to bias the retainer 605 in the clockwise direction as shown in FIGS. 16 and 17. If desired, more than one trigger 611 can be employed.

Fragmentarily and schematically shown in FIGS. 18 and 19 is another safety clutch 701 in accordance with the invention. The safety clutch 701 can be constructed along the lines previously mentioned and including a pair of oppositely radially movable counterweights 703 suitably guided for opposite radial movement.

Means are provided for releasably preventing outward counterweight movement. In the construction shown in FIGS. 18 and 19, such means includes pivotal mounting on one of the counterweights 703 of a retainer or lever 705 which includes a hook portion 707 engageable with a pin 709 on the other counterweight to thereby prevent outward radial movemnt of the counterweight in opposite directions from each other.

Means are provided for biasing the pivotally mounted retainer or lever 705 into a position affording engagement of the hook 707 with the pin 709 to prevent outward counterweight movement. In the construction shown in FIGS. 18 and 19 such means comprises a coil spring 715 having one end connected to the retainer or lever 705 and having the other end connected to a part 717 having common rotary movement with a drive element so as to urge rotation of the retainer or lever 705 in the clockwise direction as shown in FIGS. 18 and 19.

Also included in the clutch 701 shown in FIGS. 18 and 19 is trigger means in the form of a trigger 721 which is pivotally mounted on a pin 723 having common rotation with the drive element. As in the other embodiments, the trigger 721 includes a trigger arm 725 and a cam arm 727 extending generally in the opposite direction from the trigger arm 725 and adapted for engagement with the retainer or lever 705 to hold the retainer or lever 705 in a position preventing outward counterweight movement. The trigger 71 is eccentrically mounted so that, in response to drive element rotation, the trigger arm 725 moves to a position extending through an opening 731 in an annular flange 733 on a cup or support member 735 and in position for engagement with an actuating member 741 such as disclosed in connection with FIG. 1. When the trigger 721 is engaged by the actuating member 741, the cam arm 727 engages the retainer lever 705 to prevent movement thereof away from the position preventing outward counterweight movement. However, if, during drive element rotation, the actuating member 741 is moved inwardly to a position adjacently to the annular flange 733, the trigger 721 will be displaced to the position shown in FIG. 19 permitting movement of the retainer or lever 705 away from the pin 709 against the action of the spring 715 so as to permit outward counterweight movement.

It is noted that the construction shown in FIGS. 18 and 19 includes a counterweight 751 which balances the lever 705, and trigger 721.

Various of the features of the invention are set forth in the following claims:

I claim:

1. A chain saw comprising a frame, an engine mounted on said frame, a drive shaft rotatably mounted on said frame and driven by said engine, a clutch driven by said drive shaft and including a rotatable clutch drum, a clutch shoe movable relative to a position of driving engagement with said clutch drum in response to clutch shoe rotation, and selectively operable counter weight means connected to said clutch shoe for preventing engagement of said clutch shoe with said clutch drum, a bar mounted on said frame for movement bebtween a first position and a second position spaced from said first position, and means operably connected to said bar and to said counter weight means for operating said counter weight means to prevent clutch shoe engagement when said bar is in said first position and to permit clutch shoe engagement when said bar is in said second position.

2. A chain saw in accordance with claim 1 and further including means operable for braking rotation of said clutch drum in response to movement of said bar to said first position.

3. A chain saw in accordance with claim 1 wherein said frame includes a handle and wherein said first position is spaced from said handle and said second position is adjacent to said handle, and further including means operable for braking rotation of said clutch drum in response to movement of said bar to said first position.

4. A chain saw comprising a frame, an engine mounted on said frame, a drive shaft rotatably mounted on said frame and driven by said engine, a clutch driven by said drive shaft and including a rotatable clutch drum, a clutch shoe movable relative to a position of driving engagement with said clutch drum in response to clutch shoe rotation, a counter weight having a mass greater than said clutch shoe and mounted for rotation in common with said drive shaft and for radially outward movement from an inner position to an outer position in response to counter weight rotation, means connecting said clutch shoe and said counter weight for preventing engagement of said clutch drum by said clutch shoe in response to outward counter weight movement, a bar mounted on said frame for movement between a first position and a second position spaced from said first position, and means operably connected to said bar and to said counter weight for permitting outward movement of said counter weight when said bar is in said first position and for preventing outward counter weight movement when said bar is in said second position.

5. A chain saw in accordance with claim 4 wherein said means operably connecting said bar and said counterweight includes trigger means carried by said clutch for releasably preventing outward counterweight movement from said inner position to said outer position.

6. A chain saw in accordance with claim 4 and further including means operable for braking rotation of said clutch drum in response to movement of said bar to said first position.

7. A chain saw in accordance with claim 4 wherein said frame includes a handle and wherein said first position is spaced from said handle and said second position is adjacent to said handle, and further including means operable for braking rotation of said clutch drum in response to movement of said bar to said first position.

8. A centrifugal clutch comprising a drive element, a rotatable clutch drum, a clutch shoe carried by said drive element for rotation in response to drive element rotation and for radially outward movement from an inner position to an outer position of driving engagement with said clutch drum in response to clutch shoe rotation, and selectively operable means for preventing engagement of said clutch shoe with said clutch drum, said means for preventing engagement of said clutch shoe with said clutch drum including a counterweight having a mass greater than said clutch shoe, means on said drive element mounting said counterweight for rotation in response to drive element rotation and for radially outward counterweight movement from an inner position to an outer position in response to counterweight rotation and for positively preventing axial counterweight movement relative to said drive element, whereby, during operation of said selectively operable means, the axial position of said counterweight remains unchanged, and means connecting said clutch shoe and said counterweight and affording lost motion therebetween so as to permit radial clutch shoe movement between said inner and outer positions when said counterweight is in said inner position and so as to prevent engagement of said clutch drum by said clutch shoe in response to outward movement of said counterweight.

9. A clutch in accordance with claim 8 and further including means for biasing said clutch shoe toward said inner position and for preventing outward movement of said clutch shoe in the absence of clutch shoe rotation above a first predetermined speed, and means for biasing said counterweight toward said inner position and for preventing outward counterweight movement in the absence of counterweight rotation above a second predtermined speed less than said first predetermined speed.

10. A clutch in accordance with claim 8 wherein said means for preventing clutch shoe engagement with said clutch drum includes trigger means carried on one of said drive element and said counterweight for releasably preventing outward counterweight movement from said inner position to said outer position.

11. A clutch construction in accordance with claim 10 wherein said trigger means is mounted on said counterweights for movement between a first position releasably engaging each other to restrain said counterweights against outward movement and a second position disengaged from each other to permit outward counterweight movement.

12. A clutch construction in accordance with claim 10 wherein said trigger means is mounted on said counterweights for movement between a first position releasably retaining said counterweights against outward movement and a second position permitting outward movement of said counterweights.

13. A clutch construction in accordance with claim 10 wherein said trigger means includes a latch member movable between a first position preventing outward counterweight movement of said counterweight and a second position permitting outward counterweight movement, a trigger carried by said drive element for movement relative to a position engaged with said latch member to releasably retain said latch member in said first position, and means yieldably biasing one of said latch member and said trigger to releasably retain said latch member in said position.

14. A centrifugal clutch in accordance with claim 8 wherein, when said clutch is located in said outer position, said clutch shoe is operable to transmit torque to said clutch drum in response to centrifugal force generated by the rotating mass of said clutch shoe and independently of augmentation by centrifugal force associated with other components.

15. A centrifugal clutch comprising a drive element, a rotatable clutch drum, a plurality of shoes carried by said drive element for rotation in response to drive element rotation and for radially outward movement from inner positions to outer positions of driving engagement with said clutch drum in response to clutch shoe rotation, a plurality of counterweights equal in number to said clutch shoes and having masses greater than said clutch shoes, means on said drive element mounting said counterweights in axial alignment with said clutch shoes and for rotation in response to drive element rotation and for radially outward counterweight movement from inner positions to outer positions in response to counterweight rotation and for positively preventing axial counterweight movement relative to said element whereby the axial position of said counterweights remains substantially unchanged at all times, and means connecting said clutch shoes and said counterweights and affording lost motion therebetween so as to permit radial clutch shoe movement between said inner and outer positions when said counterweights are in said inner position and so as to prevent engagement of said clutch drum by said clutch shoes in response to outward counterweight movement.

16. A clutch in accordance with claim 15 wherein said clutch shoes and said counterweights are located on opposite sides of said drive element, wherein said plurality is two and wherein said means for preventing engagement of said clutch drum by said clutch shoes comprises two rocker arms fulcrumed in said drive element and respectively operably connected between the respectively axially aligned counterweights and clutch shoes.

17. A clutch in accordance with claim 15 wherein said plurality is two, wherein said clutch shoes are located in diametrically opposed relation to each other, wherein said counterweights are located in diametrically opposed relation to each other, and wherein said means for preventing engagement of said clutch drum by said clutch shoes comprises means connecting one of said clutch shoes to the one of said counterweights located in diametrically opposed relation to said one clutch shoe and means connecting the other of said clutch shoes to the one of said counterweights located in diametrically opposed relation to said other clutch shoe.

18. A clutch in accordance with claim 17 wherein said clutch shoe and counterweight connecting means comprises two fingers respectively pivotally mounted on said counterweights and including latch parts engageable with each other to prevent outward counterweight movement and trigger portions extending outwardly beyond said counterweights for engagement by an actuating member to disengage said latch parts.

19. A clutch in accordance with claim 18 including means biasing said fingers for movement toward the position when said latch parts are engaged when said counterweights are located in the inner position.

20. A clutch in accordance with claim 17 wherein said clutch shoe and counterweight connecting means comprises legs extending from said counterweights and extending in parallel relation to each other.

21. A clutch in accordance with claim 15 wherein said clutch shoes and said counterweights are located in axial alignment on opposite sides of said drive element, and wherein said means for preventing engagement of said clutch drum by said clutch shoes comprises a plurality of rocker arms equal in number to said clutch shoes and fulcrumed in said drive element and respectively operably connected between the respectively axially aligned counterweights and clutch shoes.

22. A centrifugal clutch in accordance with claim 15 wherein, when said clutch is located in said outer position, said clutch shoe is operable to transmit torque to said clutch drum in response to centrifugal force generated by the rotating mass of said clutch shoe and independently of augmentation by centrifugal force associated with other components connected to said clutch shoe.

23. A chain saw comprising a frame, an engine mounted on said frame, a drive shaft rotatably mounted on said frame and driven by said engine, a clutch driven by said drive shaft and including a rotatable clutch drum, a clutch shoe movable relative to a position of driving engagement with said clutch drum in response to clutch shoe rotation, and selectively operable means for preventing engagement of said clutch shoe with said clutch drum including a counterweight having a mass greater than said clutch shoe, means on said drive shaft mounting said counterweight for rotation in common with said drive shaft and for radially outward counterweight movement from an inner position to an outer position in response to counterweight rotation and for positively preventing axial counterweight movement relative to said drive shaft whereby, during operation of said selectively operable means, the axial position of said counterweight remains unchanged, and means connecting said clutch shoe and said counterweight and affording lost motion therebetween so as to permit radial clutch shoe movement between said inner and outer positions when said counterweight is in said inner position and so as to prevent engagement of said clutch drum by said clutch shoe in response to outward counterweight movement, and cooperating means on said clutch and on said frame for selectively preventing outward counterweight movement.

24. A chain saw in accordance with claim 23 wherein said clutch shoe is movable, in response to clutch shoe rotation, from an inner position to an outer position transmitting torque to said clutch drum in response to centrifugal force generated by the rotating mass of said clutch shoe and independently of augmentation by centrifugal force associated with other components connected to said clutch shoe.

* * * * *

UNITED STATES PATENT OFFICE
CERTIFICATE OF CORRECTION

Patent No. 3,970,178      Dated July 20, 1976

Inventor(s) Ulrich O. Densow

Page 1 of 2

It is certified that error appears in the above-identified patent and that said Letters Patent are hereby corrected as shown below:

| | |
|---|---|
| Column 4, line 65 | delete "are", insert ---can be--- |
| Column 9, line 8 | delete "not", insert ---one--- |
| Column 11, line 65 | delete "outwardly", insert ---inwardly--- |
| Column 13, line 18 | delete "612", insert ---621-- |
| Column 13, line 29 | delete "631", insert ---613-- |
| Column 16, lines 12 and 13 | delete "counterweights", insert ---counterweight--- |
| Column 16, lines 13 and 14 | delete "releasably engaging each other", insert ---located so as--- |
| Column 16, lines 14 and 15 | delete "counterweights", insert ---counterweight--- |
| Column 16, line 16 | delete "disengaged from each other", insert ---located so as--- |

PO-1050
(5/69)

UNITED STATES PATENT OFFICE
CERTIFICATE OF CORRECTION

Patent No. 3,970,178                Dated July 20, 1976

Inventor(s) Ulrich O. Densow            Page 2 of 2

It is certified that error appears in the above-identified patent and that said Letters Patent are hereby corrected as shown below:

| | |
|---|---|
| Column 16, lines 19 and 20 | delete "counterweights", insert ---counterweight--- |
| Column 16, line 21 | delete "counterweights", insert ---counterweight--- |
| Column 16, line 23 | delete "counterweights", insert ---counterweight--- |

Signed and Sealed this

Nineteenth Day of April 1977

[SEAL]

Attest:

RUTH C. MASON
*Attesting Officer*

C. MARSHALL DANN
*Commissioner of Patents and Trademarks*